United States Patent [19]

Kaga et al.

[11] Patent Number: 5,161,201
[45] Date of Patent: Nov. 3, 1992

[54] METHOD OF AND APPARATUS FOR MEASURING PATTERN PROFILE

[75] Inventors: Yasuhiro Kaga; Kei Hattori, both of Yokohama; Isahiro Hasegawa, Zushi; Fumio Komatsu, Fuchu, all of Japan

[73] Assignee: Kabushiki Kaisha Toshiba, Kawasaki, Japan

[21] Appl. No.: 651,796

[22] Filed: Feb. 7, 1991

[30] Foreign Application Priority Data

Feb. 7, 1990 [JP] Japan .................................. 2-28012

[51] Int. Cl.$^5$ ........................ G06K 9/00; G01B 11/28
[52] U.S. Cl. ...................................... 382/8; 356/379; 364/564
[58] Field of Search ........................... 382/8; 364/564; 356/379, 380

[56] References Cited

U.S. PATENT DOCUMENTS

| | | | |
|---|---|---|---|
| 4,326,252 | 4/1982 | Kohno et al. | 364/414 |
| 4,406,545 | 9/1983 | Montone et al. | 356/380 |
| 4,767,212 | 8/1988 | Kitahashi et al. | 356/379 |

Primary Examiner—Leo H. Boudreau
Assistant Examiner—Christopher Kelley
Attorney, Agent, or Firm—Foley & Lardner

[57] ABSTRACT

A pattern profile measuring method and apparatus for measuring the profile of a measuring portion of a pattern of a specimen placed on a specimen stage by controlling a deflector of a scanning electron microscope capable of setting a desired inclination angle of one of the specimen stage and an electron optical column, applying an electron beam to the measuring portion of the specimen, and image processing a secondary electron signal from the measuring portion. The method comprises: a first step of calculating the distance at the bottom portion of the measuring portion of the pattern by image processing the secondary electron signal when the electron beam is applied to the measuring portion at an inclination angle of zero; a second step of obtaining the number of pixels at a taper portion of the measuring portion of the pattern by image processing the secondary electron signal when the electron beam is applied to the measuring portion at a first predetermined inclination angle; a third step of obtaining the number of pixels at the taper portion by image processing the secondary electron signal when the electron beam is applied to the measuring portion at a second predetermined inclination angle different from the first inclination angle; a fourth step of calculating the taper angle and depth of the pattern in accordance with the numbers of pixels of the taper portion obtained at the second and third steps and the first and second predetermined inclination angles; and a fifth step of obtaining the profile of the taper portion in accordance with the strength change of the secondary electron signal from the taper portion.

3 Claims, 5 Drawing Sheets

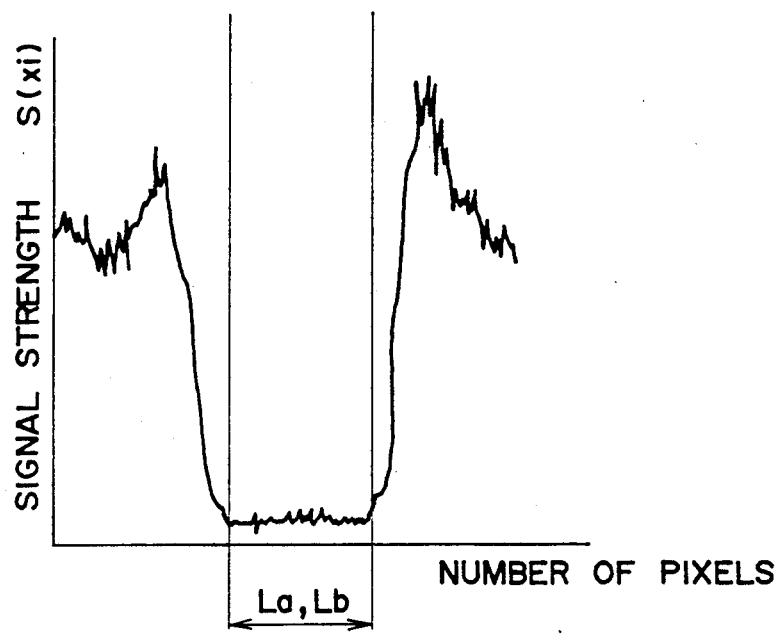
F I G. 3
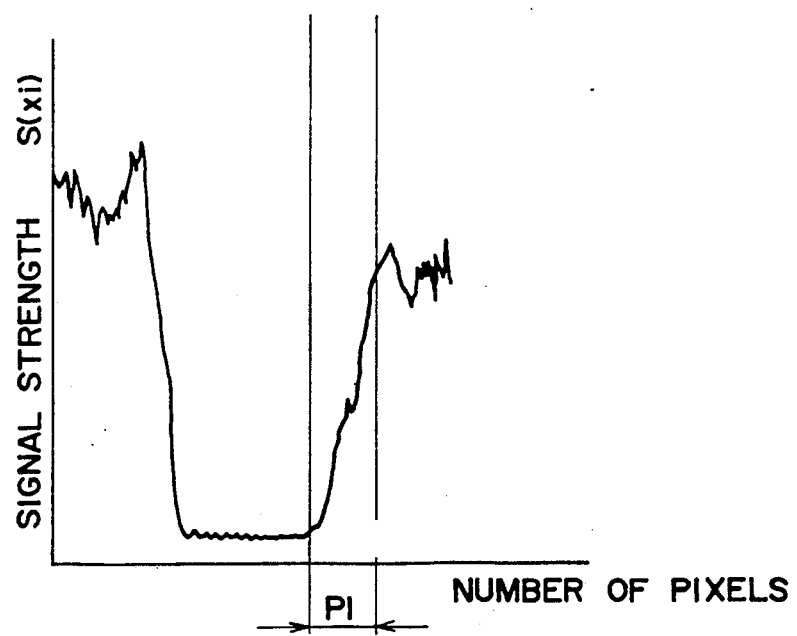
F I G. 4

METHOD OF AND APPARATUS FOR MEASURING PATTERN PROFILE

BACKGROUND OF THE INVENTION

The present invention relates to a method of, and an apparatus for, measuring a solid pattern profile using an electron beam, which is particularly suitable for the measurement of a surface area of a fine pattern of an LSI.

As a conventional technique for measuring a solid profile of a fine pattern of an LSI or the like using a scanning electron microscope (SEM), there is known and widely used a cross section observing method for observing a cross section by cutting a specimen having a fine pattern.

With such a conventional cross section observing method, it is necessary to cut a specimen. The observed specimen cannot be used as a product. Even if a specimen is disposable, it is very difficult for a trench pattern having a depth greater than the diameter to be cut vertically relative to the substrate along the central axis thereof. Furthermore, it is necessary to provide other information such as pattern pitch so that a pattern cut vertically along the central axis can be discriminated from a plurality of cut patterns.

The cross section is used for calculating a surface area which is important for calculating, for example, the capacitance of a trench capacitor. Even if the cross section observing method can be used, it is difficult to correctly and speedily measure the surface area by approximating the cross section by straight lines.

SUMMARY OF THE INVENTION

It is an object of the present invention to provide a method of and an apparatus for measuring the profile of a fine pattern capable of correctly and speedily measuring the profile and surface area of a fine pattern.

According to the first aspect of the present invention, there is provided a pattern profile measuring method for measuring the profile of a measuring portion of a pattern of a specimen placed on a specimen stage by controlling a deflector of a scanning electron microscope capable of setting a desired inclination angle of one of the specimen stage and an electron optical column, applying an electron beam to the measuring portion of the specimen, and image processing a secondary electron signal from the measuring portion, said method comprising: a first step of calculating the distance at the bottom portion of said measuring portion of said pattern by image processing said secondary electron signal when said electron beam is applied to said measuring portion at an inclination angle of zero; a second step of obtaining the number of pixels at a taper portion of said measuring portion of said pattern by image processing said secondary electron signal when said electron beam is applied to said measuring portion at a first predetermined inclination angle; a third step of obtaining the number of pixels at said taper portion by image processing said secondary electron signal when said electron beam is applied to said measuring portion at a second predetermined inclination angle different from said first inclination angle; a fourth step of calculating the taper angle and depth of said pattern in accordance with the numbers of pixels of the taper portion obtained at said second and third steps and the first and second predetermined inclination angles; and a fifth step of obtaining the profile of said taper portion in accordance with the strength change of said second electron signal from said taper portion.

According to the pattern profile measuring method of the first invention, the distance at the bottom portion of a pattern to be measured is calculated by a first step, and the number of pixels of a taper portion of the pattern is obtained for first and second predetermined inclination angles at second and third steps, respectively. In accordance with the numbers of pixels of the taper portion of the pattern obtained at the second and third steps and the first and second predetermined inclination angles, the taper angle and depth of the pattern are calculated at a fourth step.

In accordance with the strength change of the secondary electron signal from the taper potion, the profile of the taper portion is obtained at a fifth step. In accordance with the bottom edge distance and taper portion profile obtained respectively at the first and fifth steps, a surface area of the pattern to be measured is calculated at a sixth step. In the above manner, without breaking a specimen, it is possible to correctly and speedily measure the profile and surface area of a fine pattern.

According to the second aspect of the present invention, there is provided a pattern profile measuring apparatus comprising: a scanning electron microscope capable of setting a desired inclination angle by moving at least one of a specimen stage placing a specimen and an electron optical column; image processing means for processing a secondary electron signal generated from the measuring portion of the specimen placed on said specimen stage upon application of an electron beam to said measuring portion; first calculation means for calculating the bottom portion distance of said measuring portion of said pattern in accordance with an output from said image processing means when said electron beam is applied to said measuring portion at an inclination angle of zero; second calculation means for calculating the taper angle and depth of said pattern and the profile of said taper portion in accordance with an output from said image processing means when said electron beam is applied to said measuring portion at a first predetermined inclination angle and at a second predetermined inclination angle different from said first predetermined inclination angle; and third calculation means for calculating the surface area of said pattern in accordance with the outputs from said first and second calculation means.

According to the pattern profile measuring apparatus of the second invention, a first calculation means calculates the distance between bottom edges of a pattern to be measured, in accordance with an output from an image processing means when an electron beam is applied at a zero inclination angle. A second calculation means calculates the taper angle and depth of the pattern and the profile of the taper portion in accordance with an output from the image processing means when an electron beam is applied at first and second predetermined inclination angles. In accordance with the outputs from the first and second calculation means, the surface area of the pattern is calculated by a third calculation means. In the above manner, without breaking a specimen, the profile and surface area of a fine pattern can be correctly and speedily measured.

As described above, according to the present invention, the profile and surface area of a pattern to be measured can be correctly and speedily measured without breaking a specimen.

BRIEF DESCRIPTION OF THE DRAWINGS

In the accompanying drawings:

FIGS. 3 to 5 are graphs showing signal waveforms obtained by the image processing means of this invention;

DESCRIPTION OF THE PREFERRED EMBODIMENT

A preferred embodiment of this invention will be described with reference to the accompanying drawings A description is first given for an example of an object whose profile is to be measured according to the present invention.

Figure 8:
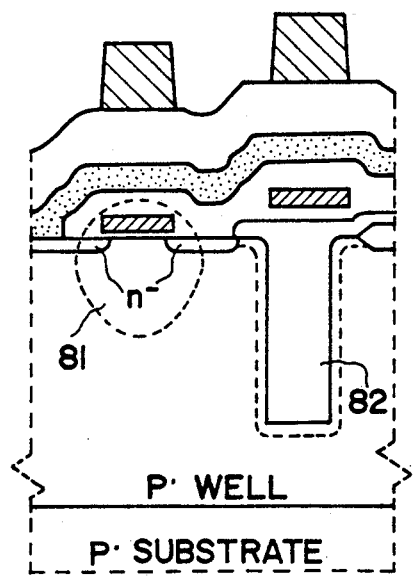
FIG. 8 is a cross section of a DRAM memory cell.

FIG. 8 shows the cross section of a DRAM memory cell having a trench structure. This DRAM memory cell is constructed of one MOS transistor 81 and one trench capacitor 82. The capacitance Cs of the trench capacitor 82 is expressed by the following equation (1):

$$Cs = \epsilon \cdot \frac{S}{d} \quad (1)$$

where $\epsilon$ represents a dielectric constant of an oxide film, d represents the film thickness of the dioxide film, and S represents a surface area of the trench of the trench capacitor. The dielectric constant $\epsilon$ and the film thickness d can be regulated by controlling the step of forming the dioxide film. However, the surface area S is difficult to be regulated. In addition, the change of the surface area S proportionally affects the capacitance Cs of the memory cell and changes the memory performance to large extent. Therefore, it is necessary to correctly determine the solid profile of a trench in order to correctly measure the surface area of the trench capacitor.

Figure 7:
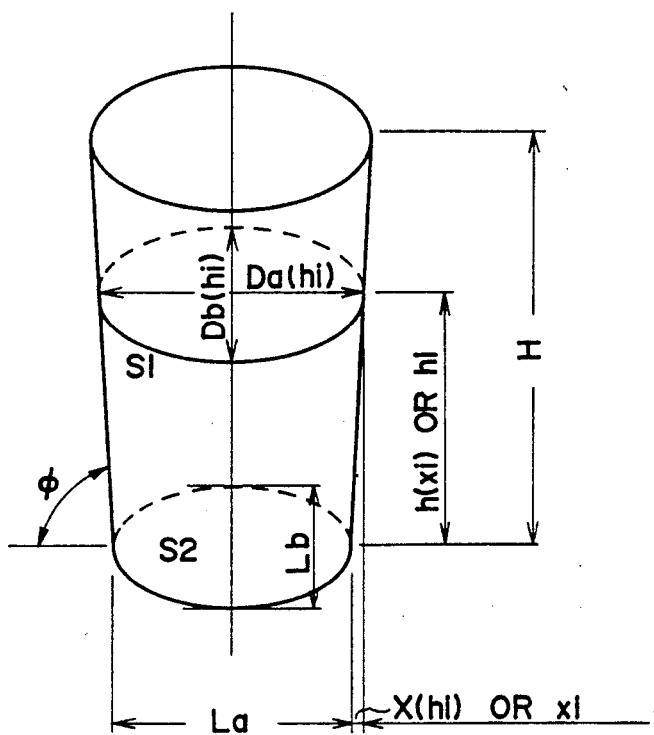
FIG. 7 is a perspective view showing the profile of a trench pattern to be measured.

FIG. 7 shows an example of a trench having the longer diameter La and the shorter diameter Lb at the bottom surface, a taper angle $\phi$, and a depth H. It is assumed that the side wall of the trench is symmetrical relative to the pattern center axis, and the vertical cross section of the pattern relative to the central axis is an ellipsoid.

Figure 1:
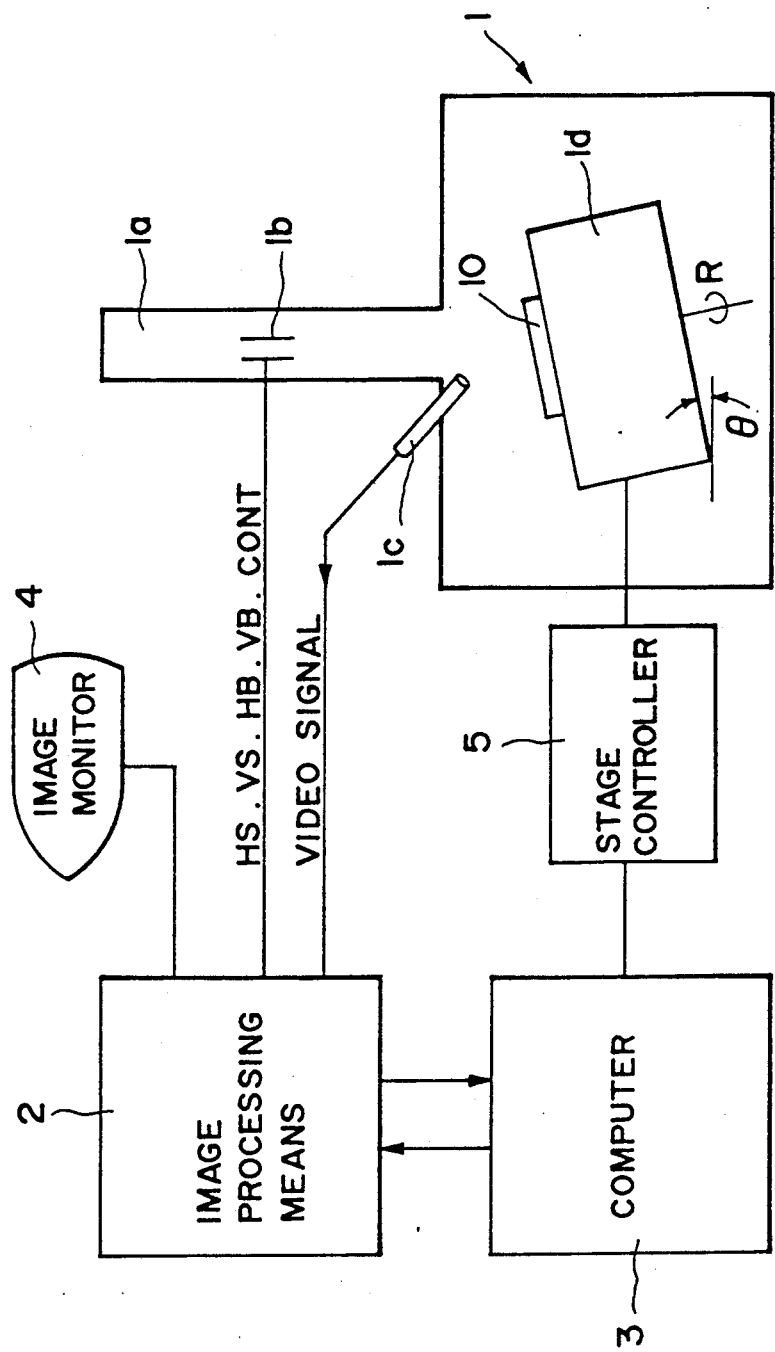
FIG. 1 is a block diagram showing the structure of a pattern dimension measuring apparatus according to an embodiment of this invention.

FIG. 1 shows the structure of a pattern profile measuring apparatus according to an embodiment of this invention. The pattern profile measuring apparatus of this embodiment is constructed of a scanning electron microscope 1 (hereinafter called an SEM) including an electron optical column 1a, deflector 1b, detector 1c, and stage 1d for holding a specimen 10, an image processing means 2 for receiving a video signal from the detector 1c and performing various image processing, a computer 3 for controlling the image processing means and the stage and for performing calculations for measurements of dimensions and shapes, an image monitor 4 and a stage controller 5.

The structure and operation of this embodiment will be described with reference to FIGS. 2 to 5 by taking as an example the case where a pattern of a reversed taper shape shown in FIG. 7 is measured.

Figure 2:
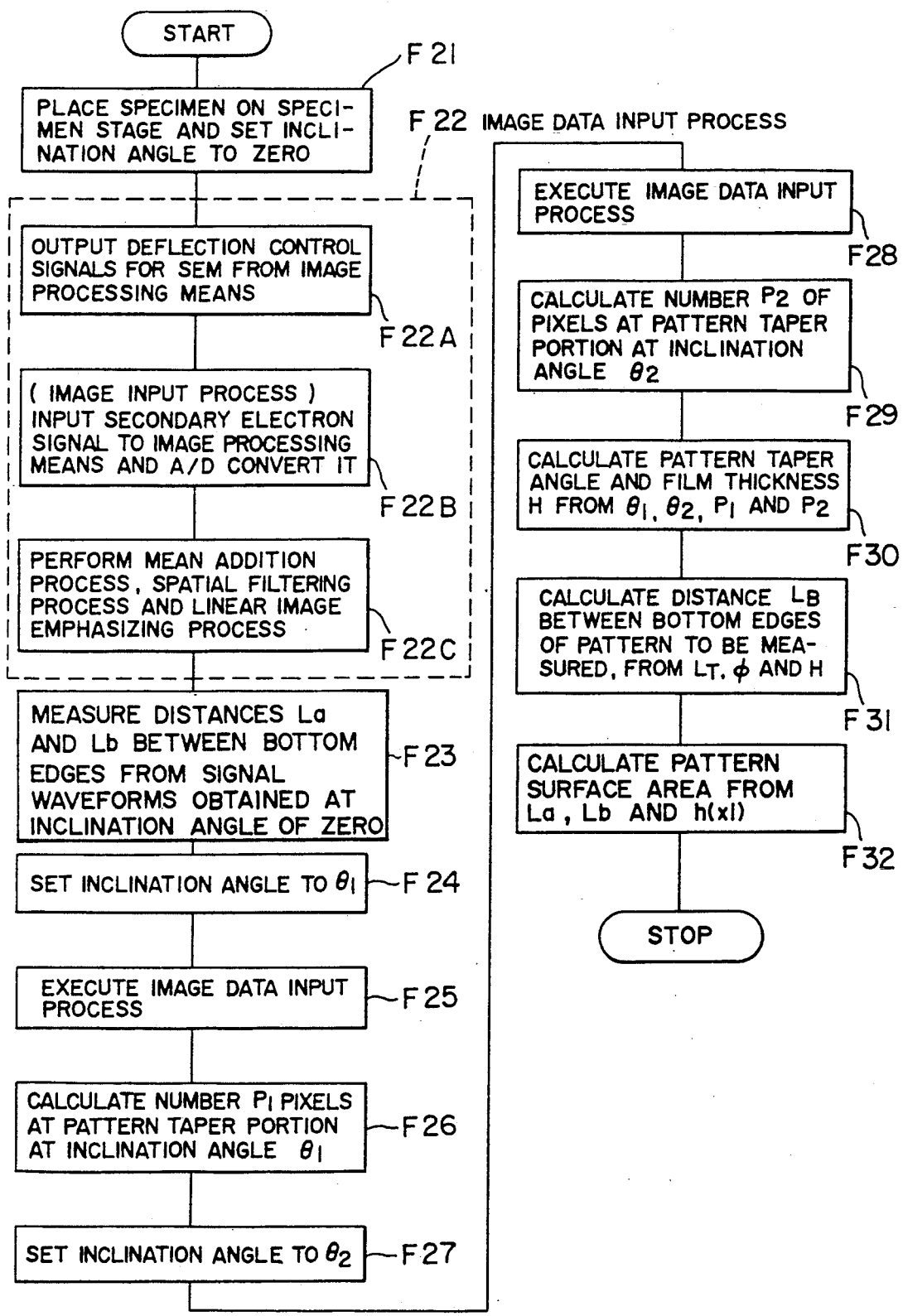
FIG. 2 is a flowchart explaining the operation of the embodiment.
Figure 5:
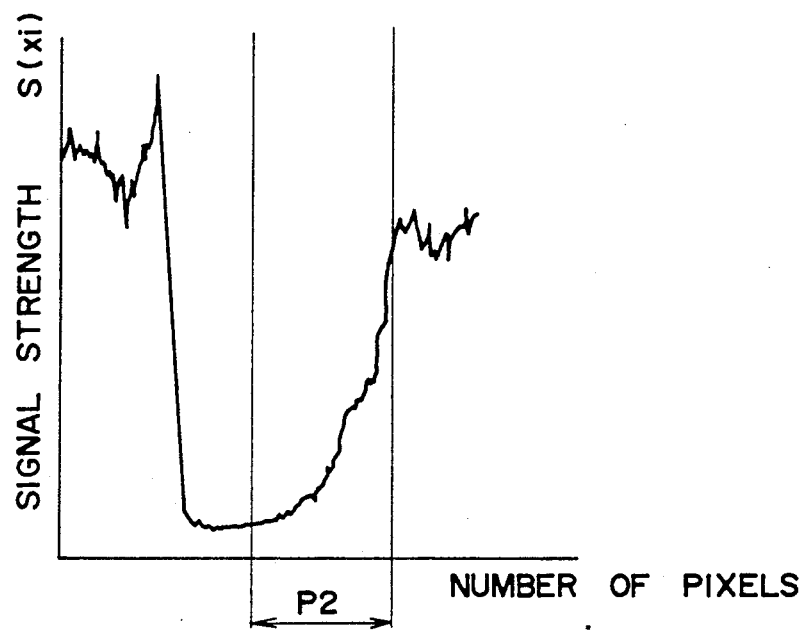

First, a specimen 10 is placed on the stage 1d and the inclination angle $\theta$ of the stage 1d is set to zero (perpendicular to the incident beam direction) by using the stage controller 5 (at step F21 of FIG. 2). After the measurement magnification M is set, the image processing means 2 sends deflection control signals for SEM 1 to the deflector 1b to thereby scan the electron beam, the deflection control signals including an Horizontal Scan (HS) signal, Vertical Scan (VS) signal, Horizontal Blank (HB) signal, Vertical Blank (VB) signal, and Control (CONT) signal (step F22A). The scanned electron beam impinges to the specimen 10 placed on the stage 1d so that secondary electrons are emitted from the specimen 10 which are then detected by the detector 1c. A detection output (secondary electron signal) from the detector 1c is sent to the image processing means 2 whereat it is sampled at a predetermined sampling timing and A/D converted (step F22B), and thereafter subjected to a mean addition process, a spatial filtering process and a linear image emphasizing process, the processed results being stored in a frame memory of the image processing means 2 having 256 tonal steps, and the signal waveforms being displayed on the image monitor 4 (step F22C). The processes from the step F22A to F22C are collectively called an image data input process hereinafter. In accordance with the signal waveforms thus obtained and shown in FIG. 3, there are obtained the number of pixels at the bottom portion of the pattern, and the bottom portion distances, i.e., longer diameter La and shorter diameter Lb, are calculated by the computer 3 (step F23).

Next, by using the stage controller 5, the inclination angle $\theta$ of the stage 1d of SEM 1 is set to a predetermined inclination angle $\theta_1$, in this example $\theta_1$ is set to three degrees, to allow observing the bottom edges (step F24), and thereafter, the above-described image input process is executed (step F25). In accordance with the obtained signal waveforms shown in FIG. 4, the number $P_1$ of pixels corresponding to the taper portion width of the pattern is obtained (step F26). Thereafter, by using the stage controller 5, the inclination angle $\theta$ of the stage 1d is set to a predetermined inclination angle $\theta_2$ (different from $\theta_1$), in this example $\theta_2$ is set to ten degrees, to allow observing the bottom edges (step F27), and thereafter the similar image input process is executed (step F28). In accordance with the obtained signal waveforms shown in FIG. 5, the number $P_2$ of pixels corresponding to the same taper portion width is obtained (step F29). In accordance with the obtained pixel numbers $P_1$ and $P_2$, the taper angle $\phi$, and depth H (film thickness) are calculated by the computer 3 using the following equations (1) and (2) derived from the stereoscopic principle (step F30):

$$\phi = \tan^{-1}\left(\frac{P_1 \cdot \cos\theta_2 - P_2 \cdot \cos\theta_1}{P_1 \cdot \sin\theta_2 - P_2 \cdot \sin\theta_1}\right) \quad (1)$$

$$H = C \cdot \frac{P_1}{M} \cdot \frac{\sin\phi}{\cos(\phi + \theta_1)} \quad (2)$$

where M represents a measurement magnification, and C represents a length on the image monitor 4 of one pixel at the measurement magnification M.

The height h ($x_i$) of the taper portion at the distance $x_i$ from the bottom edge is approximated using the corresponding secondary electron signal S ($x_i$) from the following equation (3) (step F31):

$$h(x_i) = \sum_{k=1}^{i-1}(h(x_k) - h(x_{k-1})) + \frac{S(x_i)}{\sum_{i=1}^{n}S(x_k)} \cdot H \quad (3)$$

where n represents the number of pixels corresponding to the taper portion width.

Representing the distance of the taper portion at the height $h_i$ from the bottom surface edge by X ($h_i$), the longer diameter Da ($h_i$) and shorter diameter Db ($h_i$) of the ellipsoid cross section can be expressed by:

$$\left.\begin{array}{l} Da(h_i) = La + 2 \cdot X(h_i) \\ Db(h_i) = Lb + 2 \cdot X(h_i) \end{array}\right\} \quad (4)$$

The side surface area S1 of the pattern to be measured can be calculated therefore by the computer 3 using the following equation (5a):

$$S1 = \sum_{i=1}^{n}(2 \cdot \Delta h \cdot Da(h_i) \cdot J) \quad (5a)$$

where $\Delta h$ represents the increment of height per one pixel at the height $h_i$, and J represents a value defined by the following equation (5b):

$$J = \int_{0}^{\pi/2}\sqrt{1 - k^2 \cdot \sin^2\theta}\, d\theta \quad (5b)$$

where k is given by the following equation (5c):

$$k = \frac{\sqrt{Da^2(h_i) - Db^2(h_i)}}{Da(h_i)} \quad (5c)$$

In the above equations (5a) and (5c), it is assumed that Da ($h_i$) ≧ Db ($h_i$). If Da ($h_i$) < Db ($h_i$), Da ($h_i$) and Db ($h_i$) in the equations (5a) and (5c) are exchanged. The surface area S2 at the pattern bottom portion is calculated by the computer 3 using the following equation (6):

$$S2 = \frac{\pi \cdot La \cdot Lb}{4} \quad (6)$$

The surface area S of the pattern to be measured is given therefore by:

$$S = S1 + S2 \quad (7)$$

In the above embodiment, the horizontal cross section relative to the pattern central axis is assumed to take an ellipsoid shape. If a pattern having a circular cross section is used, calculations the same as above can be carried out by setting Da ($h_i$) = Db ($h_i$) in the equation (4).

Figure 6:
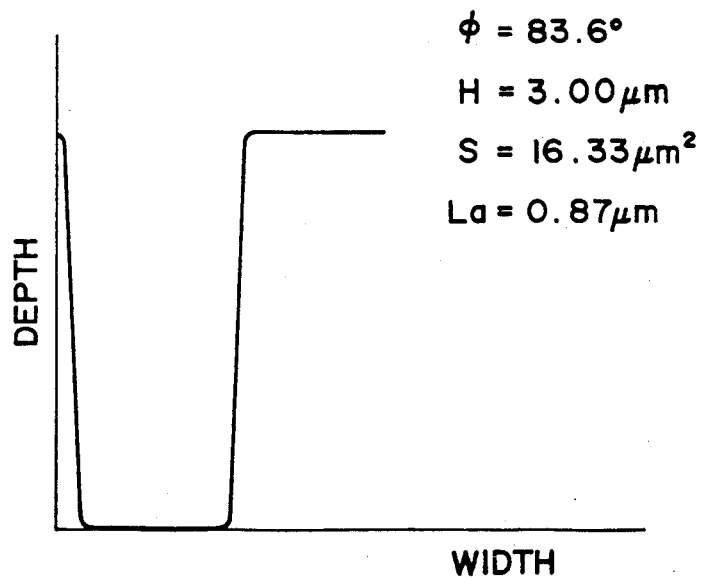
FIG. 6 is a graph showing a cross section of a trench pattern measured with the pattern dimension measuring apparatus shown in FIG. 1.

The measurement results of a trench pattern obtained using the pattern profile measuring apparatus of this embodiment are shown in FIG. 6. The measurement results at the measurement scale M of 40,000 and the inclination angles of the stage 1d of $\theta_1$ of zero degree and $\theta_2$ of six degrees, indicated that the taper angle $\phi = 83.6$ degrees, depth H = 3.00 μm, surface area S = 16.33 μm$^2$, and bottom portion distance La = 0.87 μm.

It was thus possible to correctly and easily measure the profile and surface area of the trench pattern shown in FIG. 7 without cutting the specimen.

In the above embodiment, an inclination angle is set by inclining the stage. Instead of the stage, the electron optical column may be inclined.

What is claimed is:

1. A pattern profile measuring method for measuring the profile of a measuring portion of a pattern of a specimen placed on a specimen stage by controlling a deflector of a scanning electron microscope capable of setting a desired inclination angle of one of the specimen stage and an electron optical column, applying an electron beam to the measuring portion of the specimen, and image processing a secondary electron signal from the measuring portion, said method comprising:

a first step of calculating the distance at a bottom portion of said measuring portion of said pattern by image processing said secondary electron signal when said electron beam is applied to said measuring portion at an inclination angle of zero;

a second step of obtaining a number of pixels corresponding to a taper portion width of said measuring portion of said pattern by image processing said secondary electron signal when said electron beam is applied to said measuring portion at a first predetermined inclination angle;

a third step of obtaining a number of pixels at said taper portion by image processing said secondary electron signal when said electron beam is applied to said measuring portion at a second predetermined inclination angle different from said first inclination angle;

a fourth step of calculating the taper angle and depth of said pattern in accordance with the number of pixels of the taper portion obtained at said second and third steps and the first and second predetermined inclination angles; and a fifth step of obtaining the profile of said taper portion in accordance with a change in strength of said second electron signal from said taper portion.

2. A method according to claim 1, further comprising a sixth step of calculating the surface area of said pattern to be measured in accordance with said bottom portion distance of said pattern and the said profile of said taper portion respectively obtained at said first and fifth steps.

3. A pattern profile measuring apparatus comprising:

a scanning electron microscope capable of setting a desired inclination angle by moving at least one of a specimen stage placing a specimen and an electron optical column;

image processing means for processing a secondary electron signal generated from the measuring portion of the specimen placed on said specimen stage upon application of an electron beam to said measuring portion;

first calculation means for calculating a bottom portion distance of said measuring portion of said pattern in accordance with an output from said image processing means when said electron beam is applied to said measuring portion at an inclination angle of zero;

second calculation means for calculating the taper angle and depth of said pattern and the profile of said taper portion in accordance with an output from said image processing means when said electron beam is applied to said measuring portion at a first predetermined inclination angle and at a second predetermined inclination angle different from said first predetermined inclination angle; and third calculation means for calculating the surface area of said pattern in accordance with the outputs from said first and second calculation means.

* * * * *